(12) United States Patent
Chen

(10) Patent No.: US 6,697,540 B1
(45) Date of Patent: Feb. 24, 2004

(54) METHOD FOR DIGITAL IMAGE INTERPOLATION AND SHARPNESS ENHANCEMENT

(75) Inventor: Wen-Hen Chen, Chung-Ho (TW)

(73) Assignee: Media Scope Technologies Corp., Taipei (TW)

( * ) Notice: Subject to any disclaimer, the term of this patent is extended or adjusted under 35 U.S.C. 154(b) by 635 days.

(21) Appl. No.: 09/707,041

(22) Filed: Nov. 6, 2000

(51) Int. Cl.[7] .................................................. G06T 5/00
(52) U.S. Cl. ........................ 382/300; 382/269; 348/625; 358/525
(58) Field of Search ................................. 382/300, 266, 382/263, 264, 269, 275; 358/525; 348/625, 606

(56) References Cited

U.S. PATENT DOCUMENTS

| | | | | |
|---|---|---|---|---|
| 5,485,534 A | * | 1/1996 | Takemoto et al. | 382/263 |
| 5,771,074 A | * | 6/1998 | Ibenthal | 348/444 |
| 6,072,538 A | * | 6/2000 | Keating | 348/625 |
| 6,392,765 B1 | * | 5/2002 | Sakaida | 358/525 |

OTHER PUBLICATIONS

Kim, Apparatus And Method For Compensating Image Signal, Jul. 12, 2001, U.S. patent application, Publication No. 2001/0007478 A1, pp. col 2, paragraph [0043] and col. 3, para. [0050], lines 5–7.*

* cited by examiner

Primary Examiner—Brian Werner
Assistant Examiner—Dennis Rosario-Vasquez
(74) Attorney, Agent, or Firm—Bucknam & Archer

(57) ABSTRACT

The invention disclosed a method for digital image interpolation and sharpness enhancement, said method includes the following steps: 1) Inputting an image signal Xij to a first interpolation low pass filter FIR 1, said FIR 1 is a cubic interpolation filter having filter coefficient hi(n); 2) inputting an image signal Xij to at least one of second interpolation low pass filters FIR 2, said FIR 2 is an interpolation filter having filter coefficient hi'(n), wherein said FIR 2 has a cut-off frequency lower than that of said FIR 1; 3) making FIR 1 outputted via a band pass filter to obtain an image signal tij; 4) making FIR 2 outputted via a delay buffer to obtain an image signal tij'; 5) inputting said image signal tij and tij' to a subtractor to get a differential signal tij–tij'; and 6) obtaining an output of image signal Yij by means of the following equation: Yij=tij+S·(tij–tij'), where S is a sharpness level control coefficient.

1 Claim, 2 Drawing Sheets

METHOD FOR DIGITAL IMAGE INTERPOLATION AND SHARPNESS ENHANCEMENT

FIELD OF THE INVENTION

The present invention relates to a method for digital image interpolation and sharpness enhancement, and particularly relates to a pixel interpolation for enhancing the edge sharpness of a digital image.

BACKGROUND ART

Currently, digital image has been increasingly applied in various field of image display, since its features such as clearness, non-disturbance, and easy to process, digital image has received large amount of material resources and man power investment in the research and development from global manufacture and research institute. The applications of digital image in devices such as cathode ray tube (CRT), liquid crystal display (LCD), digital projector, and bulletin display have already gained noticeable achievement in the display and process of digital image data.

In the processing of pattern or digital image data, for example magnification and reduction of pattern or image, most manufactures usually adapts image interpolation to maintain the sharpness of processed image, however, such method always generates at the edge of magnified or reduced image a poor sharpness.

Defect of poor edge sharpness is significant especially in a liquid crystal display and color digital image with screen of large-scale (for example larger than 15"). As shown in FIG. 1, a block diagram showing a method for digital image interpolation in accordance with prior art, in which only a bi-cubic filter is adapted to perform a digital image interpolation. The degradation of sharpness is due to low-pass filters employed which produce a new pixel by proportionally summing up certain adjacent pixels and result in blur and distortion at the edge of image. That is, prior image interpolation method performs interpolation for all pixels of entire image, therefore defects such as distortion or degraded sharpness appear at the edge of image.

SUMMARY OF THE INVENTION

Therefore, an object of present invention is to provide a method for digital image interpolation and sharpness enhancement. With such method, it is possible to improve the sharpness of the digital image at the edge, to achieve a preferred adjustable sharpness level, and to maintain low frequency components in the pattern or image without changing the filtering coefficient of a filter.

To achieve above object, a method for digital image interpolation and sharpness enhancement is provided in accordance with the present invention, this method comprises the following steps:

1) inputting an image (or pattern) signal Xij to a first interpolation low pass filter FIR 1, said FIR 1 is a cubic interpolation filter having filter coefficient hi(n);
2) inputting an image signal Xij to at least one of second interpolation low pass filters FIR 2, said FIR 2 is an interpolation filter having filter coefficient hi'(n), wherein said FIR 2 has a cut-off frequency lower than that of said FIR 1;
3) making FIR 1 outputted via a band pass filter to obtain an image signal tij;
4) making FIR 2 outputted via a delay buffer to obtain an image signal tij';
5) inputting said image signal tij and tij' to a subtractor to obtain a differential signal tij–tij'; and
6) obtaining an output of image (or pattern) signal Yij by means of the following equation:

$$Yij = tij + S \cdot (tij - tij'),$$

where S is a sharpness level control coefficient.

BRIEF DESCRIPTION OF DRAWINGS

The above and other objects, features, and advantages of present invention will become more apparent from the detailed description in conjunction with the following drawings.

DETAILED DESCRIPTION OF THE INVENTION

Figure 1:
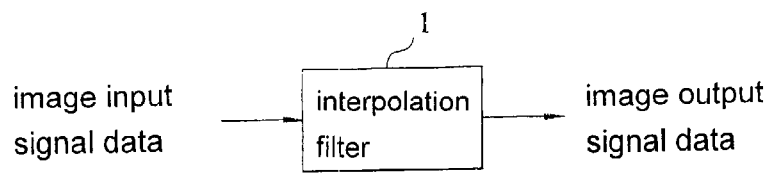
FIG. 1 is a systematic block diagram showing a method for digital image interpolation and sharpness enhancement according to present invention.
Figure 2:
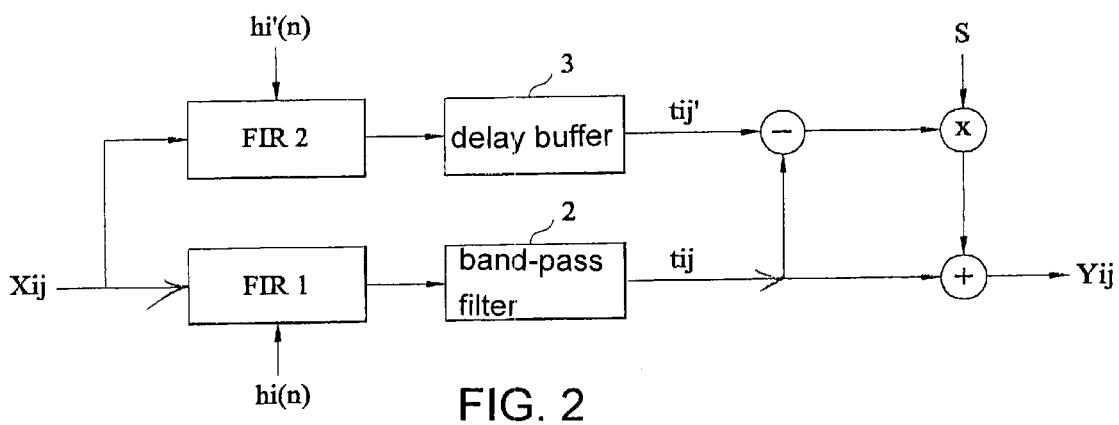
FIG. 2 is a systematic block diagram showing a method for digital image interpolation and sharpness enhancement according to present invention.

As shown in a systematic block diagram of present invention in FIG. 2, FIR 1 and FIR 2 are cubic interpolation filters having filter coefficient hi(n) and hi'(n) respectively, and said FIR 2 has a cut-off frequency lower than that of said FIR 1. When a digital image signal Xij is inputted to FIR 1 to perform bi-cubic interpolation filtering, certain adjacent pixels are processed in proportion, for example under the situation of 1-time magnification for a digital image, the image brightness signal of pixels (1+1+2+3)/4 denote a new pixel 1, the image brightness signal of pixels (1+2+2+3)/4 denote a new pixel 2, . . . , and etc., at the same time, inputting a digital image signal to FIR 2 to perform interpolation filtering process of the edge. Said FIR 1 outputs an image signal tij via a band-pass filter 2, while said FIR 2 outputs an image signal tij' via a delay buffer 3 to compensate a time difference between said image signal tij and the output of said FIR 2 due to said band-pass filter 2. Inputting both image signals tij and tij' to a subtractor to obtain a differential signal tij–tij', and then multiply said differential signal tij–tij' with a sharpness level control coefficient S to give a sharpness of controlled sharpness level (S·(tij–tij')), which is then added to interpolation processed image signal tij to provide a image output difnal Yij with improved sharpness.

Figure 3:
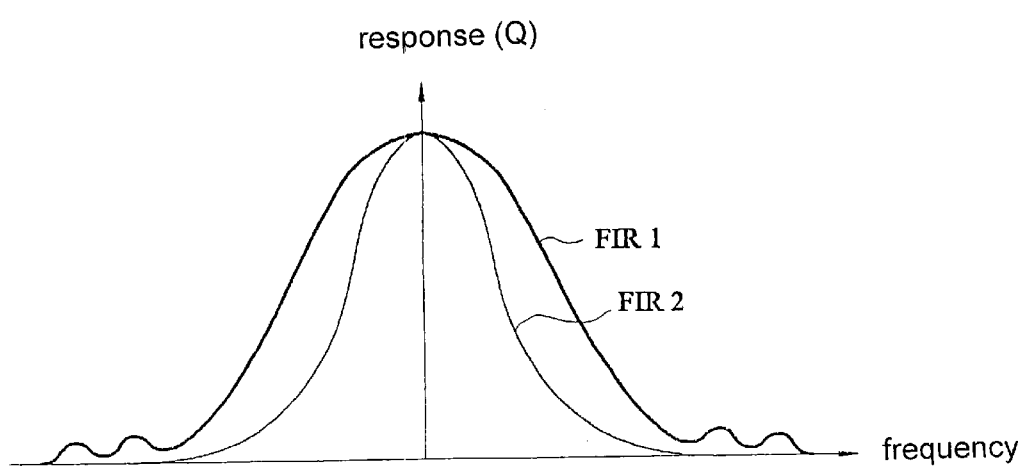
FIG. 3 is a graph showing the frequency response illustrated according to present invention.

As shown in FIG. 3, a graph showing the frequency response illustrated in accordance with present invention is depicted. Both FIR 1 and FIR 2 will process image signal with identical delay to minimize the processing bandwidth (of said filter) and buffer, so that the response curve of FIR 2 has high Q value and it is possible to obtain higher sharpness when processing the image edge.

Figure 4A:
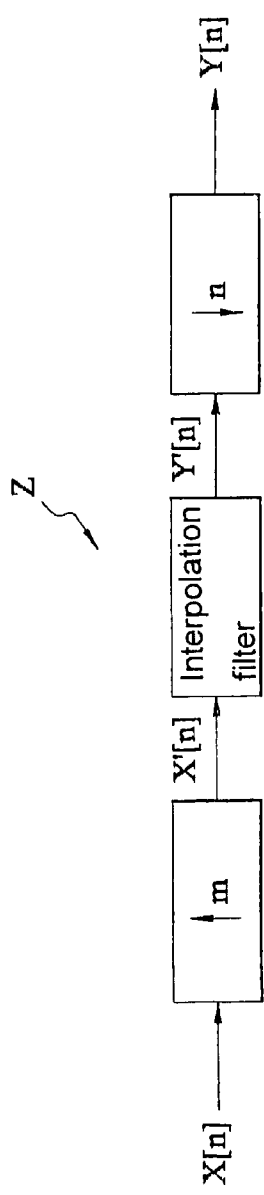
FIG. 4a is a design diagram of a single filter in a multi-phase filter.
Figure 4B:
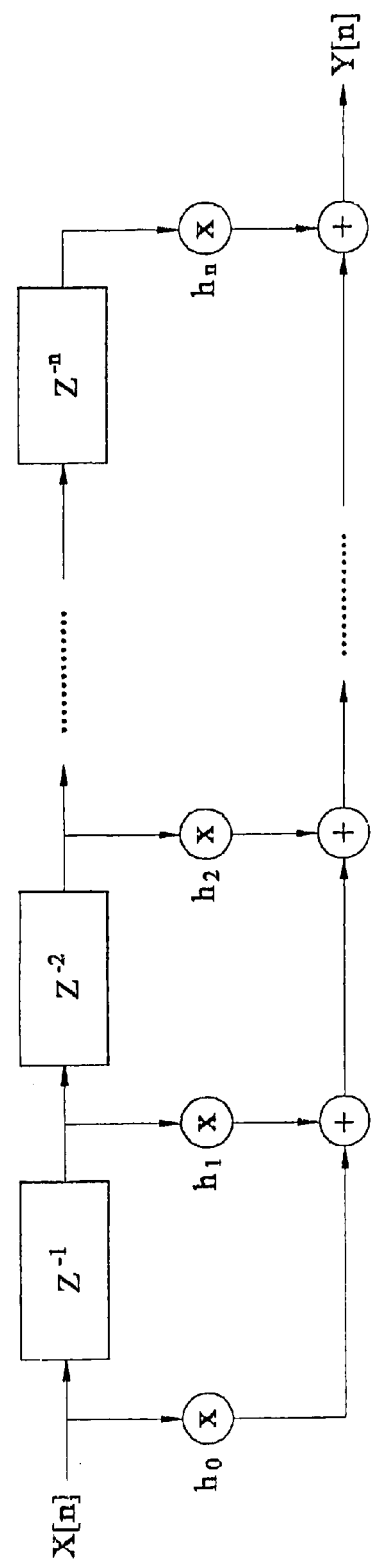
FIG. 4b is a systematic block diagram showing a multi-phase filter according to present invention.

FIG. 4a is a design diagram of a single filter in a multi-phase filter Z, wherein m and n are positive integer denotes a factor of magnification or reduction. FIG. 4b is a systematic block diagram showing a multi-phase filter constituted of many parallel-connected single filters in FIG. 4a, wherein Z is a first level filter shown in FIG. 4a. Thus, inputted image signals are summing up by single filters in several levels of said multi-phase filter, so that it is possible to obtain a non-distorted image edge sharpness.

Those who skilled in this technique will understand that present invention is not limited to above description and is allowed to have various modification and change, however, the spirit and scope of present invention is considered to fall within claims as following.

LIST OF REFERENCE NUMERALS 1 interpolation filter
2 band pass filter
3 delay buffer

What is claimed is:

1. A method for digital image interpolation and sharpness enhancement, comprises the following steps:

1) inputting an image or pattern signal $X_{ij}$ to a first interpolation low pass filter FIR 1, said FIR 1 is a cubic interpolation filter having filter coefficient $h_i(n)$;

2) inputting an image signal $X_{ij}$ to at least one of second interpolation low pass filters FIR 2, said FIR 2 is an interpolation filter having filter coefficient $h_i'(n)$, wherein said FIR 2 has a cut-off frequency lower than that of said FIR 1;

3) making FIR 1 outputted via a band pass filter to obtain an image signal $t_{ij}$;

4) making FIR 2 outputted via a delay buffer to obtain an image signal $t_{ij}'$;

5) inputting said image signal $t_{ij}$ and $t_{ij}'$ to a subtractor to obtain a differential signal $t_{ij}-t_{ij}'$; and 6) obtaining an output of image or pattern signal $Y_{ij}$ by means of the following equation:

$$Y_{ij}=t_{ij}+S\cdot(t_{ij}-t_{ij}'),$$

where S is a sharpness level control coefficient.

* * * * *